United States Patent Office 3,490,747
Patented Jan. 20, 1970

3,490,747
TEMPERATURE PROFILING MEANS
FOR TURBINE INLET
Serafino M. De Corso, Media, and Carl W. Carlson,
Holmes, Pa., assignors to Westinghouse Electric
Corporation, Pittsburgh, Pa., a corporation of
Pennsylvania
Filed Nov. 29, 1967, Ser. No. 686,573
Int. Cl. F01d 25/12; F02c 7/12
U.S. Cl. 415—175
12 Claims

ABSTRACT OF THE DISCLOSURE

The invention comprises an axial flow turbine having means for producing virtually any desired turbine inlet temperature profile corresponding to the particular mechanical stress occurring on the rotating blades of the turbine. The means comprise a plurality of circumferentially spaced tubular shaped nozzle structures extending radially into and transverse of transition passages for conducting a hot working fluid from combustion chambers to the rotating blades. The nozzle structures are effective to direct jets of relatively cool fluid into the transition passages to moderate the temperature of the hot fluid to produce a working fluid temperature profile having decreasing temperature values in an inward radial direction.

Background of the invention

The present invention relates to improvements in turbines operating with a high temperature fluid, and particularly to an arrangement for profiling the temperature of the fluid in accordance with the mechanical stresses occurring on rotating blades of the turbine.

It is known that higher initial operating temperatures in a turbine, for example, an axial flow gas turbine, will provide higher thermal efficiency and specific power output. It is also known that the allowable stress to which the blades can be subjected for a given blade life decreases with increasing temperatures. Thus, the main limiting factor in raising gas turbine operating temperatures, and thereby raising turbine efficiency and power output, is the physical capability of the rotating blades, the blades being highly stressed during turbine operation.

Rotating turbine blades are usually made individually and attached to the rim of a turbine wheel or hub so that they extend radially in an outward direction. When the wheel is rotated, the blades are subjected to a tensile stress in the radial direction due to the centrifugal force (which is a function of the weight of the blade) attendant with rotation. The stress is greatest near the root or hub portion of the blade where it is attached to the turbine wheel; the stress decreases toward the tip of the blade where it reaches a value of zero at the blade tip.

Presently, with most gas turbine designs, the temperature of the working gas flow is generally uniform along the radial height of the turbine blades. Since the root portion of the blade is stressed the greatest, and since an essentially uniform gas temperature flow sets the allowable stress for a particular blade and blade material, the root portion stress at a specified temperature is generally taken as the reference point in fixing the temperature at which the turbine blades are designed to operate in achieving a desired and efficient extraction of energy from the gas flow. This is so even though the outer radial portions of the blades can effectively handle higher temperatures because of the lower stresses imposed thereon.

As can be readily appreciated, the above approach in designing turbine blades is inherently wasteful of the potential capabilities of the outer, lesser stressed portions of the rotating blades to withstand higher temperatures and thereby increase the efficiency and power output of the turbine.

Brief summary of the invention

The present invention solves this problem by creating a turbine inlet temperature profile having any desired shape, the particular shape corresponding to the mechanical stress occurring on a particular group of rotating blades. This is accomplished by directing a relatively cool or low temperature gaseous fluid, for example air, through an annular array of tubular-shaped nozzle structures extending radially into transition passages directing the high temperature working gas to the turbine blades. The cool gas, in the form of discrete jets, functions to moderate the temperature of the working gas, so that a stream of cool gas is directed past the inner radial portion of the rotating blades where the stresses are the greatest. This, in turn, permits a higher temperature working gas to be employed against the outer portions of the blades where the stresses are not as great, thereby increasing turbine efficiency and power.

Control of the jet penetration of the low temperature gas, and therefore the turbine inlet temperature profile, is attained by control of the number and length of the nozzle structures extending into the transition passages handling the high temperature gas. Thus, the depth of jet penetration, in the present invention, is substantially independent of the quantity and density of the hot gas flow which is not the case if the means supplying the cool air jets do not penetrate into the passages directing the hot gas flow.

The drawings

The objects and advantages of the invention will become more apparent from reading the following detailed description in connection with the accompanying drawings, in which.

Preferred embodiment

Figure 1:
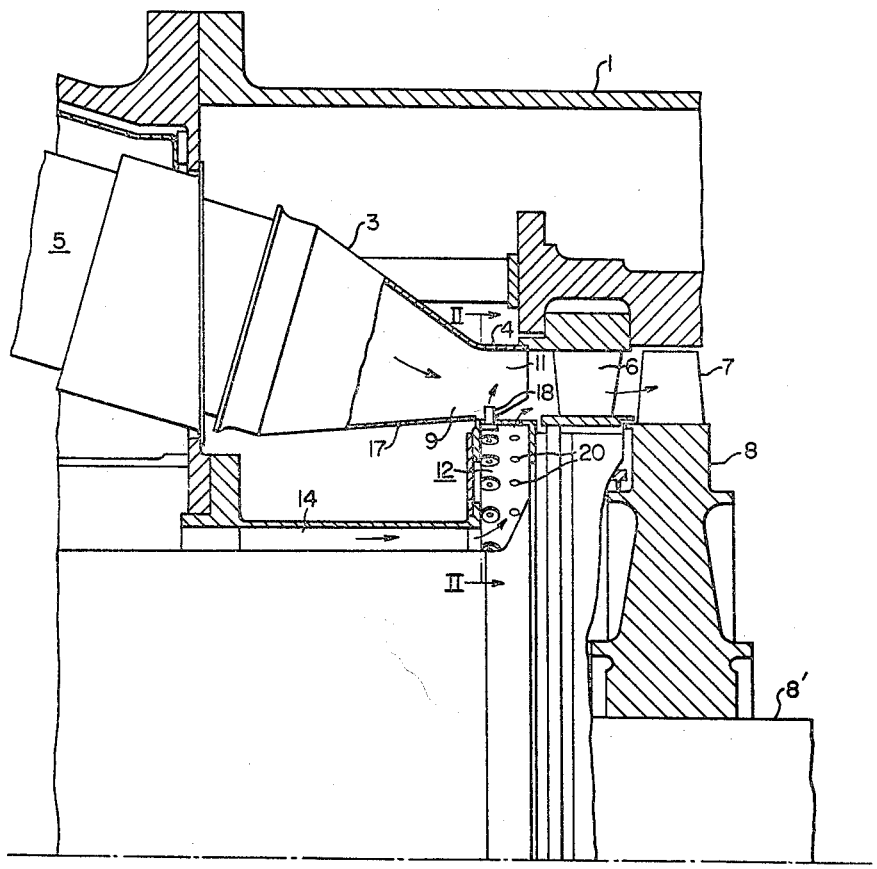
FIG. 1 is a longitudinal section of a portion of an axial flow gas turbine with a temperature profiling means constructed in accordance with the principles of the present invention.

FIGURE 1 of the drawings shows a portion of an axial flow gas turbine in longitudinal section. The turbine includes a tubular outer casing 1 enclosing a plurality of thin walled circumferentially spaced transition members 3 disposed to receive flows of hot gas from a corresponding plurality of circumferentially disposed cannister type combustion chambers 5. The transition members 3 have end portions 4 axially spaced from an annular group of circumferentially spaced stationary nozzle blades 6. Immediately downstream of the nozzle blades are disposed a corresponding number of rotor blades 7 suitably attached in an annular array to the periphery of a rotor wheel 8. The turbine may include other nozzle and rotary blades (not shown) disposed downstream from the blades 7. In the section view depicted in FIG. 1, only one of the transition members, combustion chambers and blades (6 and 7) are shown.

The transition members 3 provide passageways or channels 9 for directing the flows of hot gas from the combustion chambers 5 to the blades 6 and 7. The blades are positioned and designed to extract the energy of the hot gas flows to produce mechanical (rotational) power in a shaft 8' connected to the wheel 8.

Figure 2:
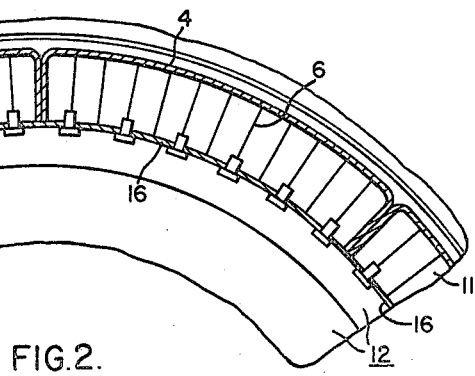
FIG. 2 is a fragmentary transverse view of the axial flow turbine and temperature profiling means taken along lines II—II of FIG. 1.

The end portions 4 of the circumferentially spaced transition members 3 are of arcuate shape and jointly form a discharge annulus 11 communicating with stationary nozzle blades 6, a partial transverse view of which is shown in FIG. 2.

Ordinarily, the temperature of the gas arriving at the discharge annulus 11 and the blades 6 and 7 of a turbine has a relatively uniform temperature distribution or profile in a radial direction. In accordance with the principles of the present invention, this temperature profile is altered and precisely controlled by jets of relatively cool gas directed into the discharge end portions 4 of the transition members 3, in a manner presently to be explained.

Adjacent the discharge end 4 of the transition member 3, as seen in FIG. 1, is disposed an annular gas entry structure or plenum chamber 12 adapted to receive a flow of relatively cool pressurized fluid from a suitable source, for example, from a compressor associated with the turbine power plant (not shown). The cool air is directed to the plenum chamber 12 through an axially extending passage 14 as best seen in FIG. 1.

In the figures, the plenum chamber 12 is depicted essentially as an annular box-shaped structure having a circumferentially extending inner wall structure 16 disposed in axial alignment with an inner wall portion 17 of the transition member 3.

In the embodiments shown in FIGS. 1 through 6, the wall 16 supports a plurality of circumferentially spaced tubular shaped nozzle structures 18 for directing an annular array of jets of the cool gas radially into the discharge annulus 11. The nozzle structures 18 extend transversely into the discharge annulus of the transition members in an outward radial direction.

Figure 3:
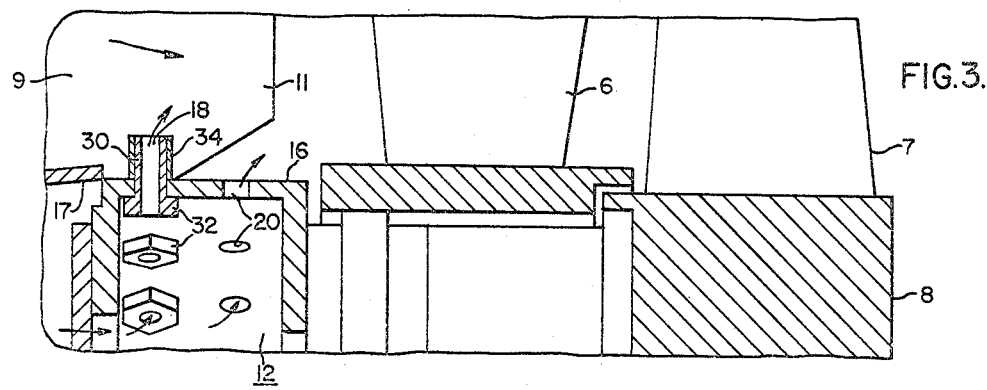
FIG. 3 is an enlarged view of the temperature profiling means of FIG. 1.

In the embodiment of the invention shown in FIGS. 1 and 3, the circumferential wall 16 of the plenum chamber 12 is provided further with a plurality of circumferentially spaced holes 20 which define orifices for directing a second annular array of jets of the cool air into the discharge annulus 11. The orifices are axially spaced downstream from the nozzle structures 18, and are shown in axial alignment or register with the nozzle structures though they may be located in an out of register manner with the nozzle structures.

Figure 4:
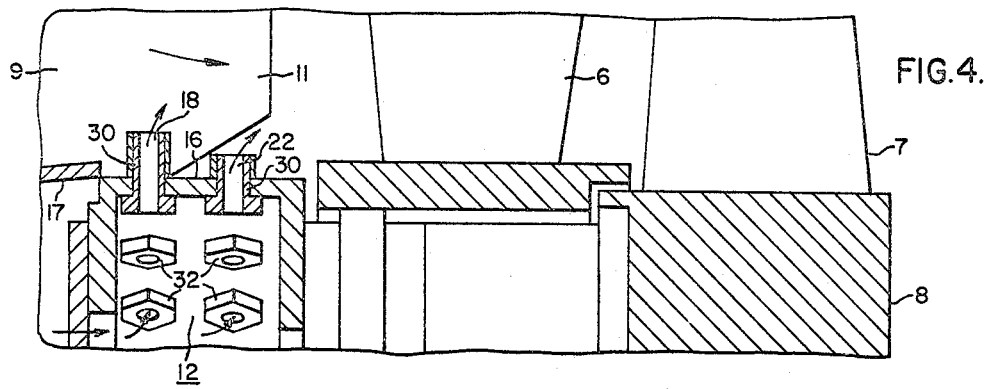
FIGS. 4 through 7 show modifications of the temperature profiling means shown in FIG. 3.

In the embodiment shown in FIG. 4, the orifices 20 are replaced by a second circumferential array of tubular shaped nozzle structures 22 which are shorter than the nozzle structures 18. Thus, the degree of penetration into the passageways 9 by the nozzle structures 22 is less than that of the nozzle structures 18.

In cross section, the shape of the nozzle structures 18 and 22, and the orifices 20 and 24 may be perfectly circular, elliptical or otherwise. Further, the shape of the inlet portions of the nozzle structures are shown uniform in cross section. They may, however, be provided with a radius of curvature to form nozzle-like inlet portions in a well known manner.

Figure 5:
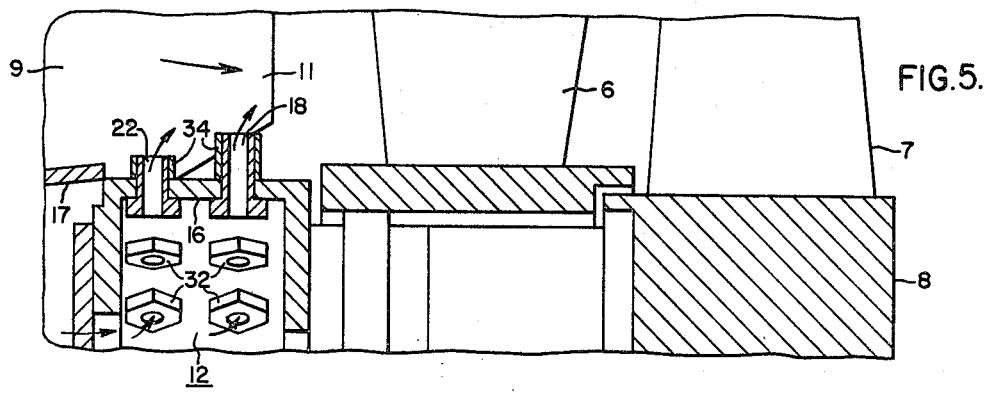

In FIG. 5, the order of the shorter and longer nozzle structures 18 and 22 is reversed in the axial direction so that the degree of nozzle penetration for each of the structures is reversed. Thus, in FIG. 5, the shorter nozzle 22 is disposed upstream of the longer nozzle 18.

Figure 6:
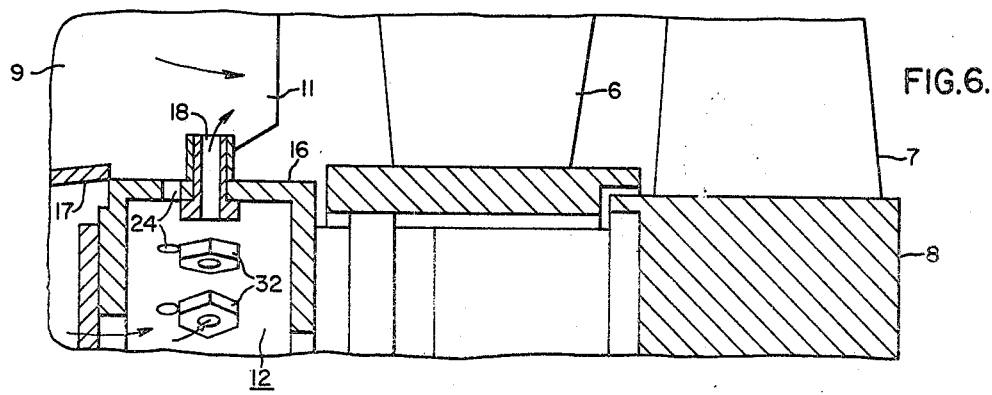

In FIG. 6, each of the nozzle structures 18 is provided with a port 24 disposed upstream and immediately adjacent each nozzle structure, the port 24 hereinafter being termed a slave port.

Figure 7:
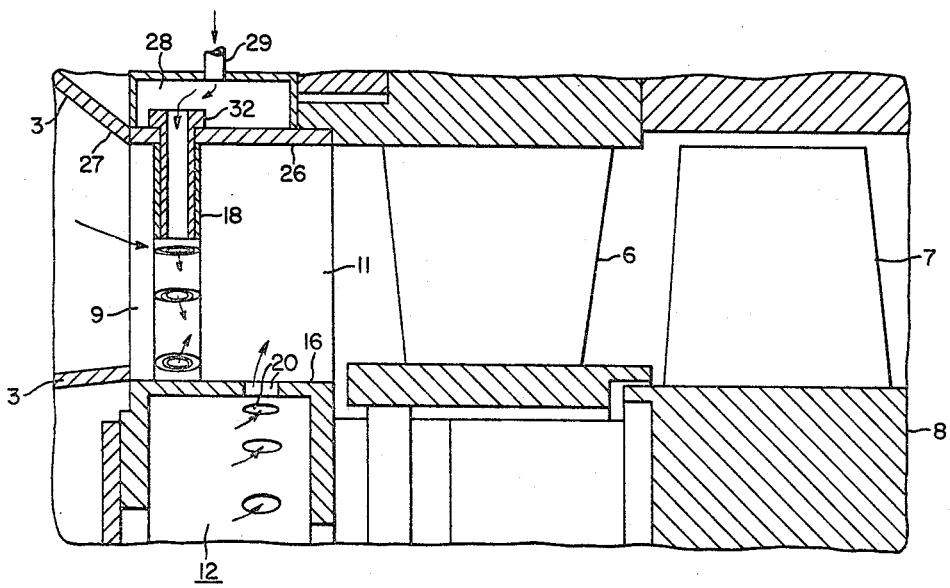

In the embodiment of the invention shown in FIG. 7, the circumferential wall 16 of the plenum chamber 12 is provided with the circumferential array of orifice defining holes 20 only. The tubular shaped nozzle structures 18 are disposed in an annular outer wall structure 26 adjacent the end of an outer wall portion 27 of the transition members 3. In this manner, the nozzle structures 18 are supported to extend in a radially inward direction into the discharge annulus 11.

A second annular shaped plenum chamber 28 is formed in combination with the wall 26 to receive a cool air flow for direction through the inwardly directed nozzle structures 18. A conduit structure 29, only partially shown in FIG. 7, may be provided to conduct the cool air to the plenum chamber from any suitable supply (not shown).

The nozzle structures 18 and 22, as shown in FIGS. 3 to 6, have a shank portion 30 and a hexagon head portion 32, the shank portion being received in the circumferential inner wall 16, and the head portion being disposed in abutment against the inside surface of the wall 16. The head portions 32, however, may be recessed in the wall 16 so that they are flush with the inside surface of the wall. The shank portion 30 may be exteriorly threaded so as to threadably engage tapped openings provided in the wall 16 accommodating the shank portions.

To lock the nozzle structures in the wall 16, sleeve means 34 may be disposed over the shank portions 30 in abutment with the outside surface of the wall 16, and welded to either the shank portion or the wall, or to both shank and wall. The sleeve 34 may be internally threaded to threadably engage the shank portion 30 though the invention is not limited to such engaging means. For example, the shank portion may be simply threaded into a tapped bore provided in the wall 16.

In the embodiment of FIG. 7, the tubular inlet means 18 may be the same or similar tube-shaped structure described above, and may be secured and locked in the outer wall portion 27 in the manner described above or in any other suitable manner.

In operation, referring to FIG. 1, the hot gases generated in the combustion chambers 5 are directed through the passageways 9 of the associated transition members 3 to the blades 6 and 7, as indicated by appropriate arrows, the blades 7 extracting the energy of the hot gas flow and converting it to mechanical, rotating energy as explained above.

Ordinarily, the radial temperature profile of the gas flow is constant or uniform so that each blade 7, from its root to tip, is subjected to a uniform temperature profile. Since the root region of the blade is subjected to the greatest stress, and since the efficiency of the turbine can be increased by increasing the temperature of the hot gas flow as explained earlier, the structures shown in FIGS. 1 to 7 are provided to produce a controlled temperature profile in the gas flow corresponding to a calculated temperature gradient for a typical rotating blade, for providing optimum turbine efficiency.

This is accomplished by directing a flow of relatively cool or low temperature gas or air through the passage 14 to the plenum chamber 12. The cool gas is then directed transversely, as indicated by arrows, into the hot gas flow in the passageways 9, in the form of an annular array of discrete jets, by the nozzle structures 18 and 22 and the orifices 20 and 24, the jets of cool gas moderating the hot gas flow to produce a gas temperature profile having decreasing temperature values in an inward direction.

In the embodiment of FIG. 3, the nozzle structures 18 direct the cool gas in an array of discrete jets radially into the passageways 9 to effect a flow of relatively cool gas in an intermediate radial area or region of the rotating blades 7, the radial location of blade cooling being dependent on the distance of nozzle penetration, i.e., the length of the nozzles 18. The root regions of the blades 7 are cooled generally by the cool gas directed radially into the passageways 9 by the orifices 20, the penetration of the cool gas flow from the orifices 20 being limited in comparison to that of the nozzles 18 which extend into the passageways 9.

In the embodiment shown in FIG. 4, the nozzles 22 inject a cool gas jet into the passageways 9 a measured distance less than that of their longer companion nozzles 18 but at a greater distance than that of the orifices 20. In this manner, the temperature profile of gas along the radial span of the blades 7 is somewhat altered from the one provided by the embodiment of FIG. 3.

In the embodiment of FIG. 5, the longer nozzles 18 are located downstream of the shorter nozzles 22 so that the jets of cool gas issuing from the shorter nozzles 22 tend to cool and shield the longer nozzles 18. In a similar manner, the slave ports 24 in the embodiment of FIG. 6, provide cool gas flow which tends to blanket the nozzles 18 as the gases travel toward the blades 6 and 7.

In the embodiment of FIG. 7, the nozzles 18 direct a cool gas flow in a radially inward direction into the passageways 9 while the orifices 20 function to direct cool gas flows in a radially outward direction into the passageways.

Figure 8:
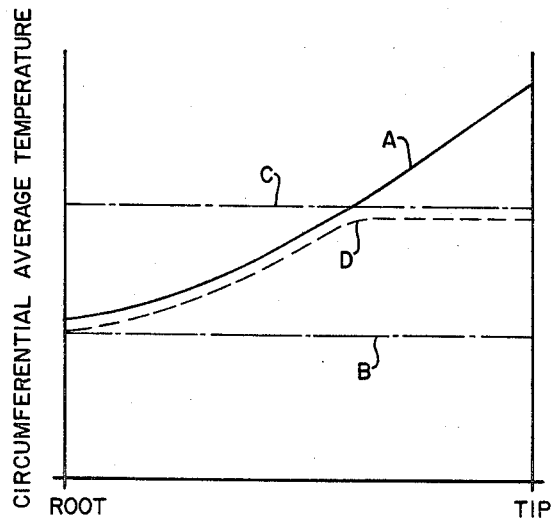
FIG. 8 comprises a group of curves showing the improved radial temperature profile in the turbine of FIG. 1 in comparison to prior art gas turbine structures.

In FIG. 8, four curves are shown which assist in explaining the advantages of the invention over prior art structures. The curves represent average temperature along the radial span of the rotating blades 7 from root to tip. Thus, curve A represents the calculated temperature gradient for a typical rotating blade, the temperature rising in a gradually curving manner from blade root to tip as shown. As explained earlier, the root temperature value for a particular blade subjected to a uniform temperature gas flow profile fixes the maximum temperature of the gas flow. In FIG. 8, such a uniform (low) temperature is represented by level line B which, as shown, must remain below, or at the most, at the low root temperature value. By profiling the temperature of the hot gas flow in accordance with the calculated temperature gradient for a particular blade and blade material (curve A), the temperature level of the uniform high temperature, gas flow in the transition member 3 can be considerably raised above that of prior art structures (curve B) as indicated by line C, thereby substantially increasing the work output of the turbine. The temperature profiling provided by the present invention is outlined by curve D which follows generally the calculated gradient curve A (with a minimum average temperature) thereby insuring a relatively cool gas flow along the hub region of the blades 7 where stresses are the greatest.

In the embodiments shown, the lengths of the tubular inlet means 18 and 22 are chosen to provide any desired temperature profile of the high temperature gas stream as it enters the flow annulus 11 of the turbine. In this way, control of the profile is made possible for any particular blade structure or material without concern for the quantity and density of the high temperature gas flow.

Though the invention has been described with a certain degree of particularity, modifications are possible without departing from the spirit and scope of the invention. For example, the nozzle structures 18 and 22 may be disposed to face each other from opposed locations across the passageways 9, and they need not be in axial and circumferential register as shown in FIGS. 4 and 5. Similarly, the orifices 20 and 24 need not be in axial alignment with nozzles 18 or in circumferential alignment as shown in FIGS. 1, 3 and 6.

What is claimed is:

1. In an axial flow turbine having turbine blades adapted to be driven by a high temperature gas acting on said blades,
   combustion structure,
   transition structure for supplying the high temperature gas from said combustion structure to said turbine blades, said transition structure defining a discharge annulus of circular shape axially spaced from the turbine blades,
   an annular array of circumferentially spaced nozzle structures defining a plurality of fluid flow passageways for directing a relatively cool pressurized fluid transversely into the discharge annulus of said transition structure,
   said nozzles being axially elongated tubular shaped members extending into said transition structure in radial direction relative to the axis of said transition structure,
   said nozzles being effective to direct an annular array of jets of the cool fluid into said annulus into penetrating relation with the high temperature gas, and to moderate the high temperature gas to produce a gas temperature profile in the turbine having decreasing temperature values in an inward, radial direction.

2. The structure recited in claim 1 in which the cool fluid passageways communicate with an annular plenum chamber having a circumferential wall portion adjacent the discharge end of the transition structure, the nozzle members being disposed in said circumferential wall portion and supported thereby.

3. The structure recited in claim 1 in which the cool fluid passageways communicate with an annular plenum chamber having a circumferential wall portion adjacent the discharge end of the transition structure and supporting the nozzle structure therein,
   a plurality of circumferentially spaced orifices provided in said circumferential wall portion adjacent the nozzle members,
   said orifices being effective to direct a second annular array of jets of cool fluid in a radial direction into the discharge end at a distance relative to that of the nozzle members.

4. The structure recited in claim 3 in which the orifices in the circumferential wall portion are located downstream from the nozzle members.

5. The structure recited in claim 3 in which the orifices in the circumferential portion are located upstream from the nozzle members.

6. The structure recited in claim 1 in which the cool fluid flow passageways include at least two rows of circumferentially spaced tubular shaped nozzle members extending transversely into the transition structure, said rows of nozzle members being spaced from each other in the direction of the flow of the high temperature gas.

7. The structure recited in claim 6 in which the nozzle members in the two rows extend different distances into the transition structure.

8. The structure recited in claim 1 in which the cool fluid passageways are located radially inward of the transition structure, and the nozzle members extend into the transition structure in a radially outward direction.

9. The structure recited in claim 1 in which the cool fluid passageways are located radially outward of the transition structure, and the nozzle members extend into the transition structure in a radially inward direction.

10. The structure recited in claim 1 in which the combustion structure includes an annular array of combustion chambers, and the transition structure includes an annular array of corresponding transition members having arcuate shaped end portions jointly disposed to form the discharge annulus.

11. The structure recited in claim 1 in which the combustion structure includes an annular array of combustion chambers, and
    the transition structure includes an annular array of corresponding transition members having arcuate shaped end portions jointly disposed to form the discharge annulus,
    an annulus plenum chamber having a circumferential wall portion disposed adjacent the arcuate shape end portions of the transition members, and supporting the nozzle members in the discharge annulus formed by the end portions of the transition members.

12. The structure recited in claim 1 in which the combustion structure includes an annular array of combustion chambers, and the transition structure includes an annular array of corresponding transition members having arcuate shaped end portions jointly disposed to form the discharge annulus, an annulus plenum chamber having a circumferential wall portion disposed adjacent the arcuate shape end portions of the transition members, and supporting the nozzle members in the discharge annulus formed by the end portions of the transition members, a plurality of circumferentially spaced orifices provided in said wall portion adjacent the nozzle structures, said orifices being effective to direct a second annular array of jets of cool fluid into the discharge annulus of the transition members.

References Cited

UNITED STATES PATENTS 2,806,355  9/1957  Schörner _____ 253—39.15

FOREIGN PATENTS

| 600,838 | 6/1960 | Canada. |
| 781,057 | 2/1935 | France. |
| 1,122,879 | 5/1956 | France. |
| 1,194,770 | 5/1959 | France. |
| 796,269 | 6/1958 | Great Britain. |

EVERETTE A. POWELL, Jr., Primary Examiner

U.S. Cl. X.R.

60—39.66